United States Patent
Diamondstein

(10) Patent No.: US 10,140,364 B1
(45) Date of Patent: Nov. 27, 2018

(54) DYNAMICALLY ALTERING SHARED CONTENT

(71) Applicant: Google Inc., Mountain View, CA (US)

(72) Inventor: Andrew Mark Diamondstein, San Francisco, CA (US)

(73) Assignee: Google LLC, Mountain View, CA (US)

( * ) Notice: Subject to any disclaimer, the term of this patent is extended or adjusted under 35 U.S.C. 154(b) by 261 days.

(21) Appl. No.: 13/975,014

(22) Filed: Aug. 23, 2013

(51) Int. Cl.
*G06F 17/30* (2006.01)

(52) U.S. Cl.
CPC ................ *G06F 17/30749* (2013.01)

(58) Field of Classification Search
CPC .................................. G06F 17/3074
See application file for complete search history.

(56) References Cited

U.S. PATENT DOCUMENTS

| | | | | |
|---|---|---|---|---|
| 6,446,261 B1 * | 9/2002 | Rosser | .................. | H04N 7/163 348/E7.061 |
| 6,698,020 B1 * | 2/2004 | Zigmond | ........... | H04N 5/44513 348/E5.102 |
| 7,200,673 B1 * | 4/2007 | Augart | .................... | H04L 41/12 709/223 |
| 7,231,651 B2 * | 6/2007 | Pong | ........................ | H04N 7/16 348/586 |
| 7,631,330 B1 * | 12/2009 | Des Jardins | ....... | H04N 7/17336 715/205 |
| 7,664,101 B1 * | 2/2010 | Croak | ..................... | H04L 12/66 370/352 |
| 8,914,360 B1 * | 12/2014 | Gailloux et al. | ............... | 707/724 |
| 2006/0195480 A1 * | 8/2006 | Spiegelman | ....... | G06F 17/30766 |
| 2009/0171995 A1 * | 7/2009 | Silvester | ........... | G06F 17/30035 |
| 2009/0204640 A1 * | 8/2009 | Christensen | ........... | G06Q 30/02 |
| 2009/0288112 A1 * | 11/2009 | Kandekar | ............... | G11B 27/11 725/32 |
| 2010/0082488 A1 * | 4/2010 | Evans et al. | .................... | 705/59 |
| 2010/0122285 A1 * | 5/2010 | Begeja | ............... | G06Q 30/0251 725/34 |
| 2010/0242063 A1 * | 9/2010 | Slaney | ............... | G06Q 30/0241 725/32 |
| 2011/0202603 A1 * | 8/2011 | Mate et al. | .................... | 709/205 |
| 2012/0016861 A1 * | 1/2012 | Edwards | ........... | G06F 17/30023 707/707 |

FOREIGN PATENT DOCUMENTS

WO    WO 2013156751 A1 * 10/2013 ........... H04N 9/8063

* cited by examiner

*Primary Examiner* — Albert M Phillips, III
(74) *Attorney, Agent, or Firm* — Lowenstein Sandler LLP

(57) ABSTRACT

A system and method for dynamically altering shared content are provided. The system includes a shared content receiver to receive raw shared content from the content sharing service; an identifier module to identify information about a visitor to the content sharing service receiving the shared content; an audio retriever to retrieve audio based on the identified information, and a shared content creator to create the shared content by overlaying the retrieved audio with the raw shared content.

14 Claims, 4 Drawing Sheets

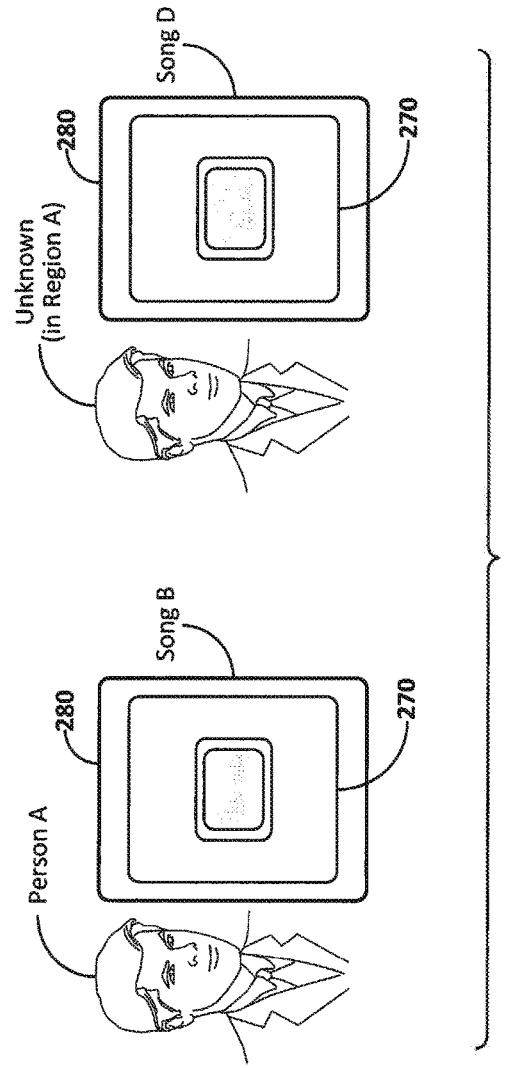

DYNAMICALLY ALTERING SHARED CONTENT

BACKGROUND

Content sharing services serve content, such as pictures, videos, text, or combinations thereof, to visitors who access the content sharing service. The content may be sourced from a publisher, automatically generated, or uploaded by one of the visitors to the content sharing service. The content may be represented as digitally encoded information. The content sharing service may store the content, or link to other services and subsequently retrieve the content prior to serving the content to the visitors.

The visitor may employ various techniques to access the content. For example, the visitor may access the content sharing service through a browser. In another example, the visitor may access the content sharing service via an application installed on a mobile device. The visitor may use any sort of device enabled to interact with the content sharing service, such as a personal computer, mobile phone, or an Internet enabled television, for example.

The content sharing service may serve shared content along with content. The shared content may be served before, during, or after the serving of the content. The shared content may be associated with meta information, and when the shared content is clicked-through by a visitor, the visitor may be redirected to additional content associated with the shared content. The shared content may provide information associated with a product or service related to the content.

The shared content may be sourced from an online shared content network. Thus, the shared content may be retrieved from the online shared content network any instance that content is retrieved from the content sharing service. Further, because the content may be served through a third-party service, such as a social network or a blog, the online shared content network may separately provide and source shared content. A third-party service may incorporate the serving of shared content absent the serving of content. In this way, the third-party service may share in any revenue generated from the serving of shared content with the online shared content network, or the content sharing service (which may or may not be partnered with the online shared content network).

The content sharing service may monetize serving the shared content. Specifically, the content sharing service may monetize whether the visitor clicked-through the shared content. Thus, shared content effective at enticing a viewer to click-through the shared content may be monetized at a higher amount than shared content that is ignored. Further, the shared content may be incorporated with a bypass function. In certain cases, the online shared content network may monetize the serving of shared content when the viewer does not enable the bypass function (or does not enable the bypass function after a predetermined time threshold).

SUMMARY

A system and method for system and method for dynamically altering shared content are provided. The system includes a shared content receiver to receive raw shared content from the content sharing service; an identifier module to identify information about a visitor to the content sharing service receiving the shared content; an audio retriever to retrieve audio based on the identified information, and a shared content creator to create the shared content by overlaying the retrieved audio with the raw shared content.

DESCRIPTION OF THE DRAWINGS

The detailed description refers to the following drawings, in which like numerals refer to like items, and in which:

FIG. 4 illustrates an example implementation of a lookup table for the system in FIG. 2.

FIG. 5 illustrates an example implementation of the system of FIG. 2 employing data in the lookup table in FIG. 4.

DETAILED DESCRIPTION

Figure 1:
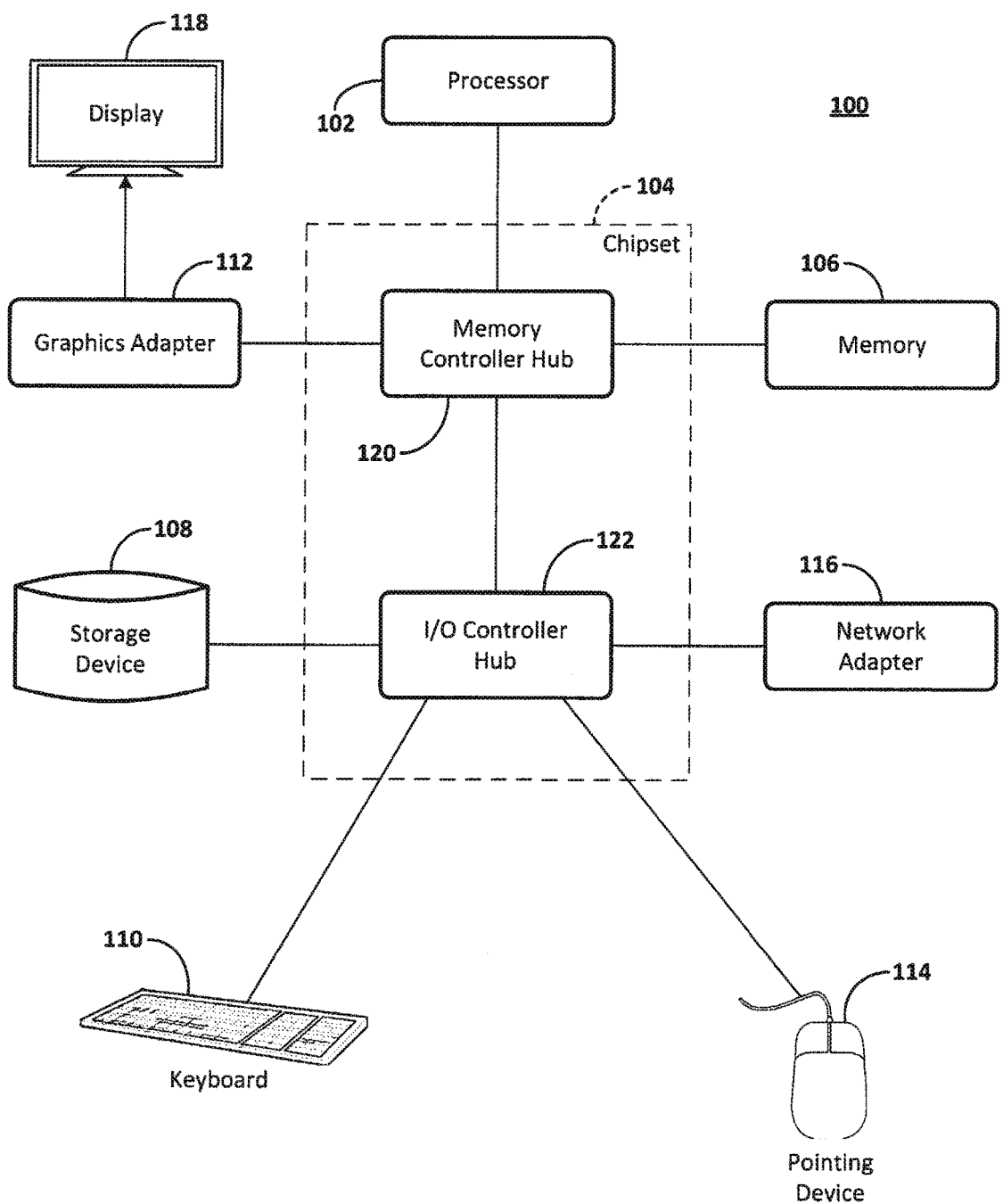
FIG. 1 is a block diagram illustrating an example computer.

Content sharing services and online shared content networks serve and distribute shared content along with content. The shared content may be directed to a good or service. The shared content may be embedded with meta information, and subsequently, when clicked through, the party clicking through may be redirected to an online source with additional information about the associated good or service.

The content sharing service and online shared content networks may monetize the serving of shared content, and thus, collect revenue contingent on cases that the visitors click-through the shared content, or consumes the shared content in its entirety (i.e. not enabling a bypass function after a predetermined time).

Thus, the operators of the content sharing service and online shared content network may be incentivized to ensure that visitors who are served the shared content receive shared content in which the visitor may be interested in. For example, if the visitor has expressed interest in a topic, such as sports, the content sharing service and online shared content network may serve shared content directed to sports.

The shared content may be composed of several elements, such as a video, overlaid audio, and text, for example. In certain cases, while the subject matter of the shared content may be of interest to the visitor, the audio portion may alienate the visitor, and thus, encourage the visitor to ignore the shared content. For example, the good or service associate with the shared content may be of interest, but if the audio is directed to country music, and the visitor does not enjoy country music, the visitor may enable the bypass function. In these cases, the content sharing service and online shared content network may not be able to monetize the serving of shared content.

The aspects disclosed herein are directed to dynamically altering shared content to encourage a visitor being served the shared content to click-through or fully consume the shared content. By dynamically altering the shared content, for example, by adding audio that the visitor may be interested in, the shared content may be of greater interest to the visitor, and thus, the probability of the visitor clicking through the shared content or consuming the shared content in its entirety is increased.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network 250.

Figure 2:
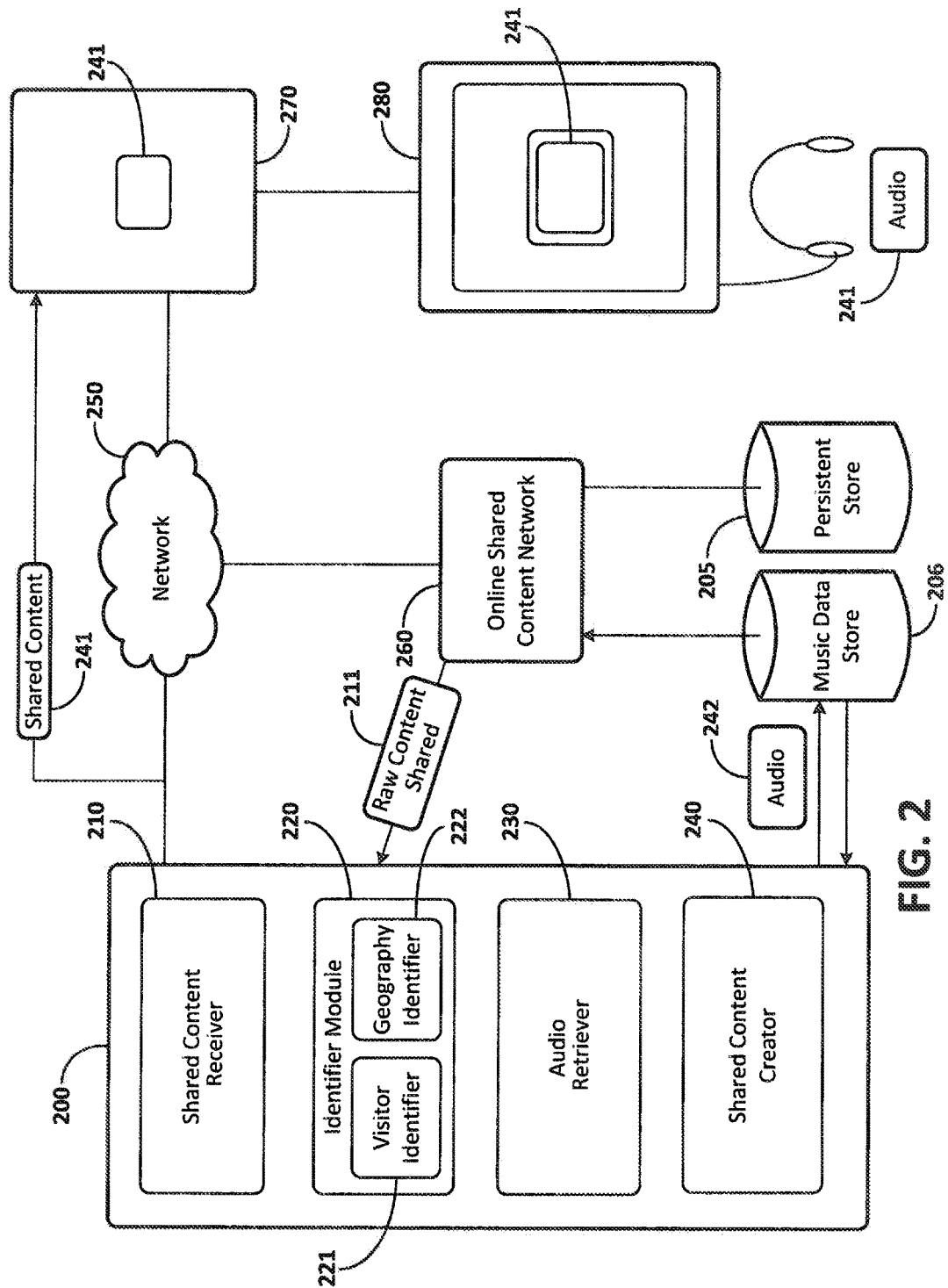
FIG. 2 illustrates an example of a system for dynamically altering shared content.

FIG. 2 illustrates an example of a system 200 for dynamically altering shared content 241. The system 200 includes a shared content receiver 210, an identifier module 220, an audio retriever 230, and a shared content creator 240. The system 200 may be implemented on a device, such as computer 100. The system 200 interacts with an online shared content network 260 or a content sharing serving 270 via network 250. The online shared content network 260 and the content sharing service 270 may communicate with a persistent store 205. The persistent store 205 may be a data storage device, such as any of the devices enumerated above in regards to storage device 108.

In response to a device 280 accessing the content sharing service 270, and specifically, a content item, the content sharing service 270 retrieves shared content 241 to serve to the device 280. The shared content 241 may be served before, during, or after the serving of the content.

In another example, a third-party service (not shown) may embed a space to display shared content 241. The shared content 241 may be served in response to a device 280 accessing the third-party service. The third-party service may share the monetization earned by serving the shared content 241. Thus, in response to the device 280 accessing the third-party service, the third-party service may request shared content 241 directly from the online shared content network 260 (via network 250).

The shared content receiver 210 receives raw shared content 211. The raw shared content 211 may be generated in response to the device accessing the content sharing service 270 or a third-party service, that requests shared content 241. The raw shared content 211 may be chosen by the content sharing service 270 or online shared content network 260 based on various techniques, such as ascertaining a preference of the visitor being served shared content 241, or previous content accessed by the visitor, for example.

The raw shared content 211 contains a base element of the shared content 241 to be served. For example, the base element may be a video, or the shared content 241 absent any sort of backing audio. The addition of this audio element is described in detail further below.

The identifier module 220 includes a visitor identifier 221, and a geography identifier 222. The identifier module 220 identifies aspects of the device 280, and the visitor employing the device 280 being served the shared content 241.

The visitor identifier 221 identifies the visitor associated with the device 280. For example, if the visitor is logged into the content sharing service 270, the visitor identifier 221 may ascertain the visitor's identity. Thus, through ascertaining the visitor's identity, the visitor identifier 221 may become cognizant of certain of the visitor's preferences and attributes.

The visitor may have registered certain preferences with the content sharing service 270, such as preferred genres of music, favorite activities, favorite movies, for example. Alternatively, or additionally to, the visitor may have accessed certain content, such as music directed to a specific genre or artist. In another example, the visitor may enter certain personal aspects, such as the visitor's age or gender.

In another example, the visitor identifier 221 may identify content items the visitor has purchased. The content items the visitor has purchased may subsequently be employed to ascertain a preference of audio or other content to augment the raw shared content 211 with.

The geography identifier 222 identifies the visitor's geographical location. One such technique for performing this task is to detect device 280's internet protocol (IP) address. Employing the detected IP address, the geography identifier 222 may ascertain device 280's location.

Identifying the geography may facilitate in understanding the visitor's preferences. For example, in cases where a certain artist is popular in a specific region, the geography identifier 222 may aid the audio retriever 230 retrieve audio content from the certain artist for the visitor. Further, in cases where the visitor is not logged into the content sharing service 270, the geography identifier 222 identifies at least one aspect of the visitor which may be employed to retrieve audio content in which the visitor may prefer.

The audio retriever 230 retrieves audio to augment the raw shared content 211. The audio retrieval may employ any of the information ascertained by the identifier module 220.

The audio retriever 230 may interact with a music data store 206. The music data store 206 may communicate with the online shared content network 260 and the content sharing service 270.

The audio retriever 230 may determine, employing a lookup table, the audio 242 to augment the raw shared content 211 with. For example, based on the information about the visitor falling within certain categories, such as preferences for a genre, age, etc., the audio retriever 230 may employ a lookup table, and determine which audio 242 to augment the raw shared content 211 with. The lookup table may be provided along with the raw shared content 211, and thus, sourced from the raw shared content 211 requester. Alternatively, if the raw shared content 211 does not include a lookup table, the system 200 may have a default lookup table, and retrieve the audio suited for the visitor identified by the identifier module 220.

For example, if the visitor identifier module 221 determines that the visitor's age is 24, the audio retriever 230 may retrieve audio 242 that is popular with a group between the ages of 22-30. In another example, if the visitor identifier module 221 determines that the visitor prefers a specific genre, such as classical, the audio retriever 230 may retrieve a classical music piece as audio 242.

In another example, in response to the visitor not being logged in, the geography identifier 222 may be relied upon. For example, if the visitor is identified as living in a specific region, an audio item popular with that region may be selected.

In another example, instead of augmenting raw shared content 211 with various audio items, the system 200 may select an image from a set of images (either per each raw shared content 211 or a default set of images). The image may be predefined to be served to visitors who are identified with the information ascertained by the identifier module 220 employing the aspects described above in regards to the audio retriever 230.

The shared content creator 240 creates shared content 241 by overlaying the audio 242 retrieved via the audio retriever 230 with the raw shared content 211. Once the shared content 241 is created, the shared content 241 may be transmitted via network 250, and served to the device 280. Thus, the visitor operating device 280 to access the content sharing service 270 may be served shared content 241.

Figure 3:
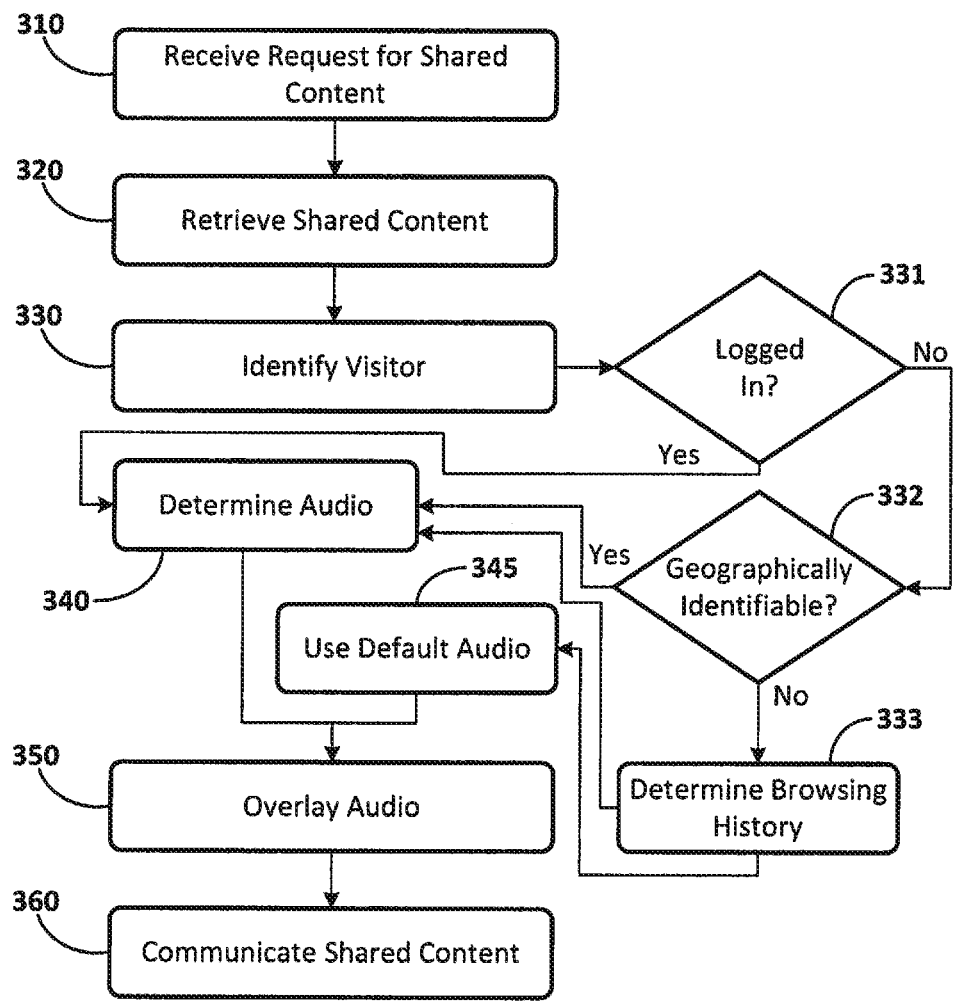
FIG. 3 illustrates an example of a method for dynamically altering shared content.

FIG. 3 illustrates an example method 300 for dynamically altering shared content. The method 300 may be implemented on a device, such as computer 100.

In operation 310, a request is made for shared content. The requesting source may be a content sharing service 270, or a third-party service that serves content or embeds a space to serve shared content. As explained above, the shared content serving may be monetized.

In operation 320, raw shared content is received from an online shared content network 270 or from a content sharing service 260. The raw shared content may include a partial portion of the completed shared content to be served. For example, the raw shared content may include the video aspect of the shared content to be served.

In operation 330, the audience receiving the shared content is identified. For example, if a device 280 accesses a content sharing service 270, the visitor associated with the device 280 is identified (if possible).

In operation 331, a determination is made as to whether the visitor is logged in. If the visitor is logged into the content sharing service 260 or registered with the online shared content network 270, the visitor may be identified. Based on this identification, various aspects about the visitor may be ascertained, such as the visitor's age or preferences, for example.

If the visitor is logged in, and identified, the method 300 may proceed to operation 340. If not, the method 300 proceeds to operation 332. In operation 332, a geographical identification is made about the visitor associated with user device 280. For example, the geographical identification may be ascertained by obtaining an IP address associated with the user device 280.

The method 300 may proceed to operation 340. Alternatively, if no geographical identification is made, the method 300 may proceed to operation 333. In operation 333, a record is made of the visitor's previous content access. Thus, if a trend is detected, i.e. the visitor accessed content of a certain genre or artist, this trend may be recorded.

Operations 331, 332, and 333 are shown as occurring independent of each other in FIG. 3. In an alternate example, various combinations of the three operations may be performed. For example, the method 300 may ascertain the visitor being logged in (operation 331) and a geographical identification (332). If none of operations 331, 332, and 333 are able to identify the visitor or aspects of the visitor, the method 300 proceeds to operation 345. In operation 345, a default audio item is added the raw shared content.

In operation 340, based on the identifications made in operation 331-333, an audio item to be added to the shared content may be retrieved. In operation 340, a lookup table associated with the raw shared content may be employed. Thus, based on the visitor's information ascertain in operations 331-333, an audio item may be chosen. Alternatively, if the raw shared content does not include a lookup table of associated audio items to add, the method 300 may employ a default lookup table.

In operation 350, the audio item selected in either operations 340 and 345 is overlaid onto the raw shared content. Thus, shared content may be created from the raw shared content sourced in operation 320 combined with the retrieved audio item (operations 340 and 345).

In operation 360, the created shared content is communicated to the receiving party. For example, the created shared content may be communicated to the content sharing service 260, which may then be served to the visitor associated with device 280

FIG. 4 illustrates an example implementation of a lookup table 400 employed with system 200. FIG. 5 illustrates an example implementation of system 200 employing the data shown in the lookup table 400.

Referring to FIG. 4, the lookup table 400 includes three fields, an identification field 410, a region field 420, and an audio field 430. The implementation depicted in FIG. 4 is an example, and any of the identifying information described with system 200 and method 300 may be employed. For each entry in the identification field 410 and region field 420, a type of visitor is described, and a corresponding song is also included (audio field 430). Although not shown, certain other attributes may be implemented with the lookup table 400, such as age, genre preferences, and the like.

As shown in FIG. 5, if person A is accessing the content sharing service 270 via device 280, employing the data in lookup table 400, song B is served along with the shared content 241 being served via device 280.

If an unknown visitor is accessing the content sharing service 270 via device 280 (but is identified as being in region A), employing the data in lookup table 400, song D is served along with the shared content 241 being served via device 280.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

I claim:

1. A system comprising:
a memory;
a processor, coupled with the memory, the processor to:
receive a request for shared video content of a content sharing service;
determine geographical data for a user device of a visitor to the content sharing service, wherein the visitor is unknown to the content sharing service and the geographical data is determined based on a network address of the user device;
determine an audio preference for the visitor based on the determined geographical data and a lookup table comprising a plurality of geography identifiers;
retrieve audio from a data store comprising multiple audio items based on the determined audio preference of the visitor, wherein the audio is associated with an entry in the lookup table that corresponds to the determined geographical data for the user device; and
augment the shared video content by removing all audio of the shared video content and adding the retrieved audio to the shared video content.

2. The system according to claim 1, wherein the geographical data indicates a specific region of the visitor based on an Internet protocol address associated with the user device of the visitor.

3. The system according to claim 1, wherein to retrieve the audio, the processor is to retrieve the audio from a list of audio items sourced via the shared video content.

4. The system according to claim 1, wherein to retrieve the audio, the processor is to retrieve the audio from a list of audio items sourced from the content sharing service.

5. The system according to claim 1, wherein in response to the visitor being unknown to the content sharing service, the processor is to retrieve a default audio item in view of the lookup table and the geographical data.

6. The system according to claim 1, wherein the shared video content from the content sharing service is absent all audio after the removal of the audio portion until the shared video content is augmented to include the audio from the data store.

7. A non-transitory computer readable storage medium comprising instructions that cause a processor to:
receive a request for shared video content of an online shared content network;
determine geographical data for a user device of a visitor to the online shared content network, wherein the visitor is unknown to the online shared content network and the geographical data is determined based on a network address of the user device;
determine an audio preference for the visitor based the determined geographical data and a lookup table comprising a plurality of geography identifiers;
retrieve audio from a data store comprising multiple audio items based on the determined audio preference of the visitor, wherein the audio is associated with an entry in the lookup table that corresponds to the determined geographical data of the user device; and
augment the shared video content by removing all audio of the shared video content and adding the retrieved audio to the shared video content.

8. The non-transitory computer readable storage medium according to claim 7, wherein the geographical data indicates a specific region of the visitor based on an Internet protocol address associated with the user device of the visitor.

9. The non-transitory computer readable storage medium according to claim 7, wherein to retrieve the audio, the processor is to retrieve the audio from a list of audio items sourced via the shared video content.

10. The non-transitory computer readable storage medium according to claim 7, wherein to retrieve the audio, the processor is to retrieve the audio from a list of audio items sourced from an audio data store.

11. The non-transitory computer readable storage medium according to claim 7, wherein in response to the visitor being unknown to the online shared content network, the audio retriever retrieves a default audio item in view of the lookup table and the geographical data.

12. A method comprising:
receiving a request for shared video content of a content sharing service;
retrieving the shared video content based on the request for shared video content;
determining geographical data for a user device being served the shared video content, the user device being associated with a visitor that is unknown to the content sharing service and the geographical data determined based on a network address of the user device;
determining, by a processor, an audio preference for the visitor based on the determined geographical data and a lookup table comprising a plurality of geography identifiers;
retrieving, by the processor, audio from a data store comprising multiple audio items based on the determined audio preference, wherein the audio is associated with an entry in the lookup table that corresponds to the determined geographical data for the user device;
augmenting the shared video content by removing all audio of the shared video content and adding the retrieved audio to the shared video content; and
communicating the shared video content to the user device;
wherein at least one of the receiving, the retrieving, the determining, the augmenting, and the communicating is performed by the processor.

13. The method according to claim 12, wherein the geographical data indicates a specific region of the visitor based on an Internet protocol associated with the user device.

14. The method according to claim 12, wherein the retrieving of the audio is from a list of audio items sourced from the content sharing service.

* * * * *